June 28, 1960

R. A. FRYKLUND 2,943,296

SONIC APPARATUS FOR MEASURING THE
LEVEL OF STORED MATERIALS

Filed Aug. 9, 1955

INVENTOR
ROBERT A. FRYKLUND
BY Elmer J. Gorn
ATTORNEY

INVENTOR
ROBERT A. FRYKLUND
By
ATTORNEY

June 28, 1960 R. A. FRYKLUND 2,943,296
SONIC APPARATUS FOR MEASURING THE
LEVEL OF STORED MATERIALS
Filed Aug. 9, 1955 4 Sheets-Sheet 3

INVENTOR
ROBERT A. FRYKLUND
BY Elmer J. Gorn
ATTORNEY

INVENTOR
ROBERT A. FRYKLUND
BY Elmer J. Gorn
ATTORNEY

United States Patent Office 2,943,296
Patented June 28, 1960

2,943,296

SONIC APPARATUS FOR MEASURING THE LEVEL OF STORED MATERIALS

Robert A. Fryklund, Johnson City, N.Y., assignor to Raytheon Company, a corporation of Delaware Filed Aug. 9, 1955, Ser. No. 527,337

2 Claims. (Cl. 340—1)

This invention relates to the measurement of stored material, such as the quantity of liquid in a tank, or the amount of coal, grain, or the like in a storage bin.

The invention utilizes "sound" echo travel time as a factor in such measurements, and also utilizes novel electrical methods and a novel physical arrangement of apparatus for converting "sound" echo into a visual indication, at a conveniently remote point, of the linear distance intervening between a salient point on the surface of the stored material and the point of reception of the echo. The term "sound" is placed in quotation marks to indicate that the echoing energy waves may be of either sonic or supersonic frequency, it being conventional in the art to employ the term to embrace supersonic echoes as well as the normally audible echoes.

In the illustrated embodiment of the invention an energy wave is projected downward from a transducer assembly mounted, say, from five to fifty feet above the highest point attainable by the surface of the stored material, and the wave is reflected back from such surface to a parabolic reflecting surface on the transducer assembly. From the parabolic reflector the returning echo is directed against a third reflecting surface of relatively small area at the focal region of the assembly from which focal region the echo moves upward in a confined conduit to impinge upon a pressure-sensitive component of the transducer proper. The impinging echo energy will cause generation of current in the windings of the electromagnetic component of the transducer, inducing therein a voltage proportional to the magnitude of the impinging echo, and thereby setting in motion electrical mechanism serving to visually indicate (as a linear measurement) the period elapsing between initial transmission of the "sound" energy and receipt of the echo. The voltage thus induced is utilized to control the energization of a movable lamp element constituting the visual index element traveling at constant speed in a path adjacent a dial calibrated in feet, or in cubical measuring units. The invention resides partly in the physical and electrical structures and inter-relationships embodied in the transmitting, receiving, and indicating components of the system as herein specifically illustrated, but it also embraces the concept of the system itself, considered as an integrated whole, and independently of the structural details of its several parts.

These and other characteristics and potentialities of the invention will become more apparent upon reference to the following detailed description of the embodiment thereof illustrated in the accompanying drawings wherein.

Figures 1, 2:
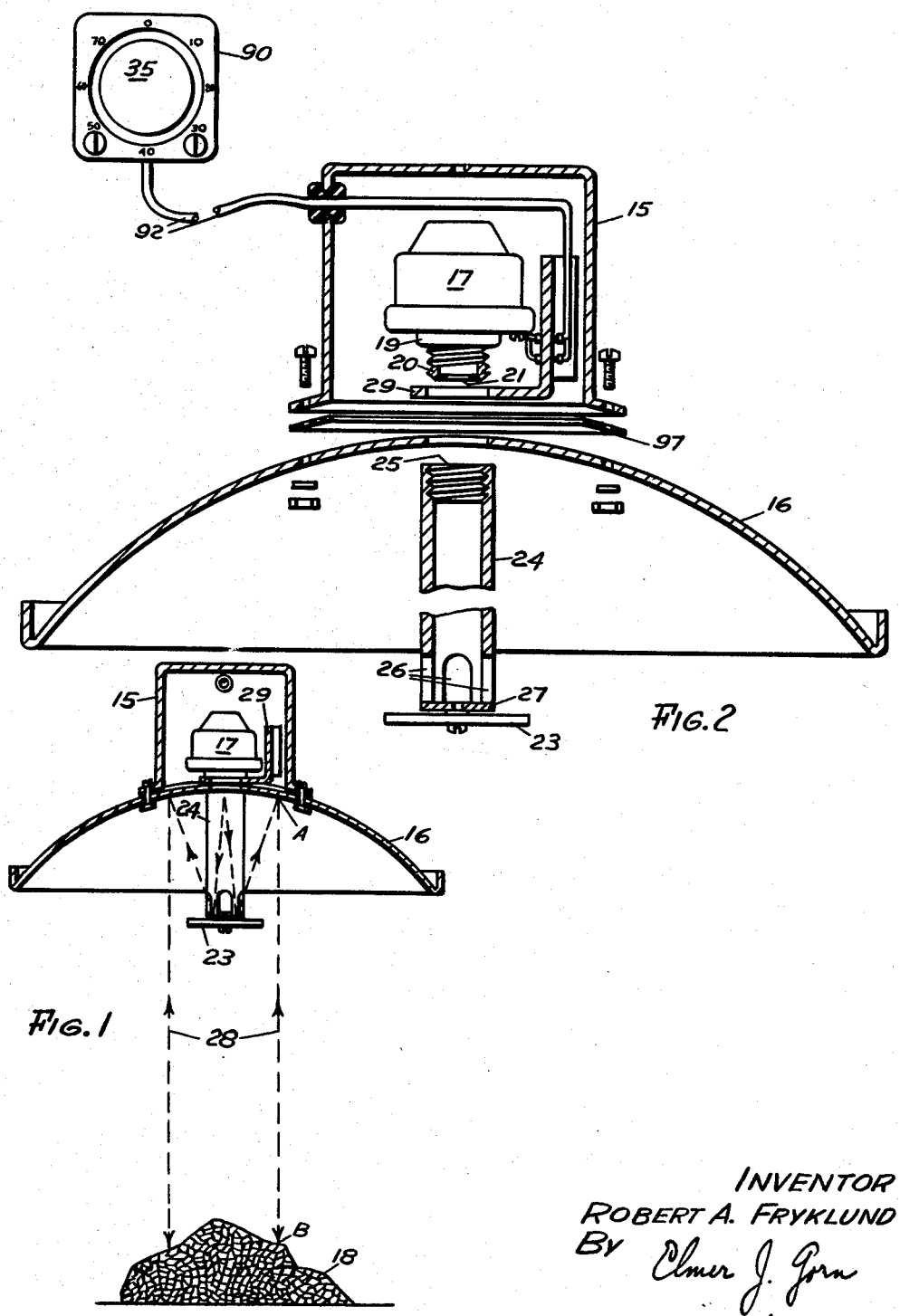
Fig. 1 shows diagrammatically an embodiment of the invention.
Fig. 2 is an exploded view of the transducer assembly of Fig. 1, with most of the components shown in vertical section.

Referring first to Figs. 1 and 2, the transducer assembly includes a protective upper housing 15, a parabolic reflector 16, and the transducer component 17 disposed just above the reflector and within the housing 15. The reflector 16 has a peripheral flange by which it is attached in any suitable manner to the ceiling or ceiling framework (not shown) of a storage bin or compartment containing a quantity of freely movable bulk material 18 such as coal, wheat, or other grain or mineral material piled loosely on the floor of the storage compartment. Alternatively (as heretofore noted), the material to be measured may be in a liquid or other fluid state, and confined in a tank or the like.

Figure 6:
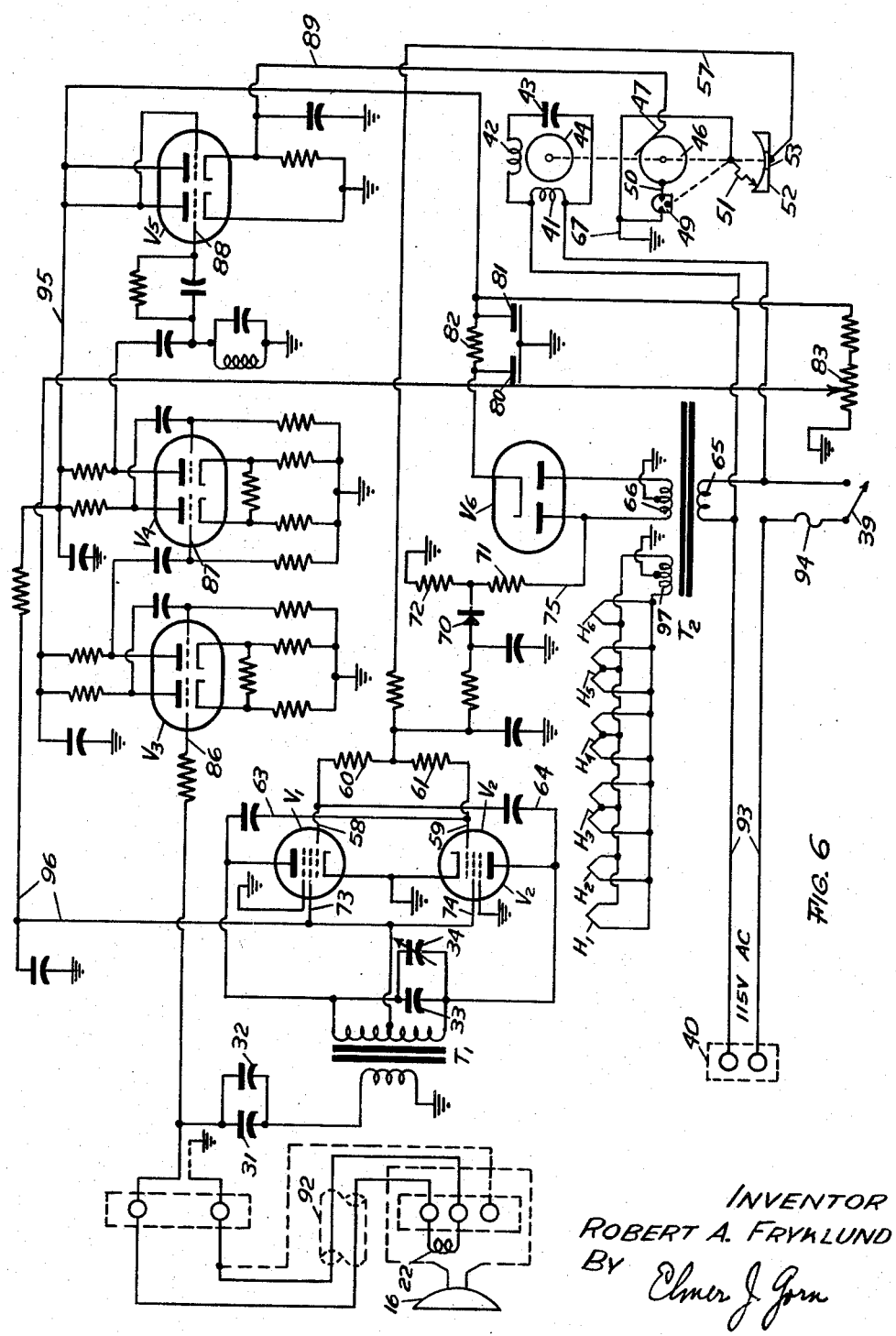
Fig. 6 shows the electrical connections entering into the system.

The transducer casing 17 has a centrally disposed depending portion 19 terminating in an externally threaded boss 20 carrying across its mouth a diaphragm 21 adapted to be set in vibration by the magnetostrictive effect of a nickel core element upon which is wound the coil 22 shown schematically in Fig. 6, the construction of the core and coil, which are housed within casing 17, being of any known form as, for example, that indicated at "6" and "7" in Fig. 1 of Fryklund Patent No. 2,498,990 granted February 28, 1950.

The novel means for inter-relating the transducer casing 17 and the reflector 16 in proper focus, one to the other, is shown as including a metallic tube 24 having internal threads 25 at one end thereof for engagement with the threads 20 of the casing extension 19, and also having lateral openings 26 adjacent the closed end surface 27 to which is attached a larger disc 23 serving as a baffle. The reflector 16 is centrally apertured, as is also the L-shaped bracket element 29, to allow passage over the extending shank 19 of the transducer casing to which casing the said parts 16 and 29 are clamped by the action of threading the tube 24 onto the boss 20 of the transducer casing. The length of tube 24 is so chosen that the assembling action just described automatically establishes a wave length between diaphragm 21 and the first reflecting surface 27 that corresponds to one of the overtones of the fundamental wave length of the sound waves propagated by the vibrating magnetostrictive assembly, the higher frequency of such overtones being preferable because of the more pronounced sound wave effect afforded thereby.

Figure 5:
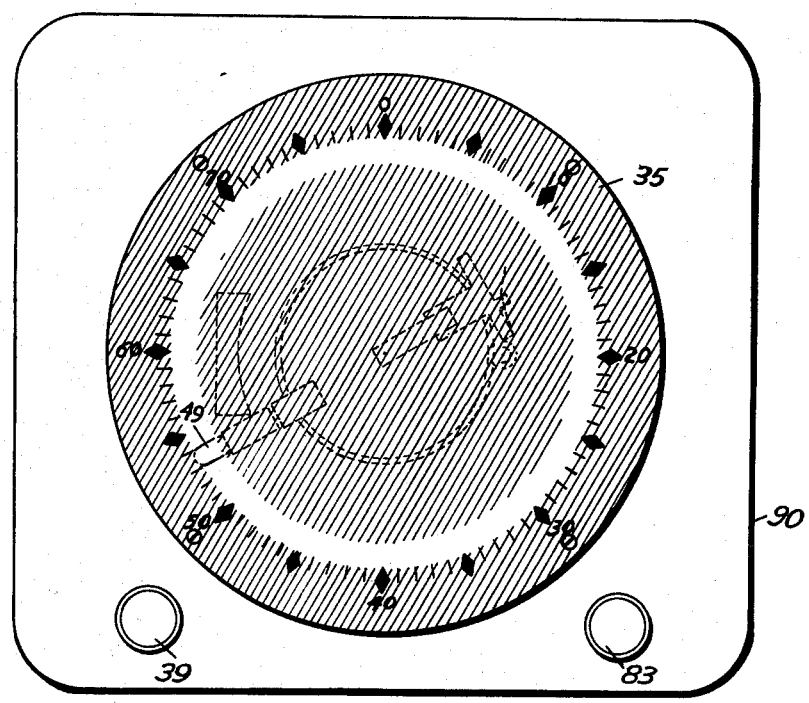
Fig. 5 is a plan view of the indicator instrument cover element onto which is set the dial carrying the scaled markings.

From primary reflecting surface 27 the sound waves are reflected back to the surface of parabolic reflector 16, thence downward in a substantially vertical path to the surface of the loosely piled material, as indicated at 28 in Fig. 1. Here the sound waves are again reflected and retrace the path above described, so that the energy returns to diaphragm 21 and the core of the coil 22 to produce a new surge of electrical energy in said coil for delivery to the receiver and indicator circuitry to produce on indicator dial 35 (Fig. 5) an indication of the linear distance between points A and B in Fig. 1. The said circuitry, as shown schematically in Fig. 6, will now be described.

A source 40 of alternating current, preferably of 115 volts or thereabouts, is provided for energization of a constant speed motor 38 (Figs. 3 and 4) having dual or split-phase stator windings 41 and 42 (Fig. 6) with a capacitor 43 in circuit with one of said windings to facilitate starting thereof, and having its rotor 44 inductively affected by the stator field for rotation at constant speed in a synchronous manner.

Rotatable with the motor-operated nonconducting disc 45 (see Figs. 3 and 4) is a conducting ring 46 (Fig. 6)

against which bears a spring contact brush 47. Also rotatable with disc 45 is an arm 48 (see Fig. 4) carrying a glow discharge lamp 49 for illumination of a spot on indicator dial 35 corresponding to the distance A—B in Fig. 1. Disc 45 also carries a spring contact assembly 51 adapted to sweep along the arcuate surface of dielectric block 52, making contact with metallic insert 53 at one point in each revolution of disc 45, whose rotary speed is about one-twelfth that of rotor 44, by reason of the diametral ratio between pinion 55 and the gear constituted by the teeth of disc 45.

A conductor 57 connects metal insert 53, above described, with the control grid circuits 58, 59 of push-pull amplifiers $V_1$ and $V_2$, by way of resistors 60 and 61 to produce conduction through said tubes $V_1$ and $V_2$ and a corresponding flow of energy in the primary circuit of transformer $T_1$ when "keying" occurs at 53, as above described. As is obvious from Fig. 6, the action of the contact assembly 51 engaging the metal insert 53 is to connect the grid circuits 58 and 59 to ground thus substantially removing the hold-off bias which was imposed on said circuit by the rectifier 70. The rectifier 70 produces this bias action by rectifying the voltage of one-half of the winding 66 through conductor 75 and thus imposing said rectifying voltage on the condenser network connected to said grid circuits through resistor 71, balanced by grounded resistor 72. Winding 66 is also, of course, the energy source for the plate circuits 63, 64 of tubes $V_1$ and $V_2$. As is also obvious from Fig. 6, the voltage of winding 66 is rectified by the full wave rectifier $V_6$ and is led to the plate circuits 63 and 64 through serially connected leads 95 and 96. These leads also provide the bias voltage for the screen grids 73 and 74.

When the transformer $T_1$ is energized, momentarily, in the manner just described, the parallel capacitors 31 and 32, in circuit with the secondary winding of said transformer $T_1$, function to discharge energy through coil 22 of the transducer, and the diaphragm 21 is thereby shocked into oscillation at the frequency corresponding to that of the overtones inherent in the resonant structure constituted by the tube 24.

Simultaneously with the energization of transducer coil 22, in the manner just described, there is a triggering of amplifier tube $V_3$, by way of grid circuit 86, and, in turn, of amplifier tube $V_4$, by way of grid circuit 87, and of amplifier tube $V_5$, by way of grid circuit 88. Tube $V_5$ is of the cathode follower type, so that its cathode-connected lead 89 serves to produce a flashing of lamp 49, by way of brush 47, ring 46, and lead 50. Preferably the ground connection from lamp 49 is constituted by a conductor 67, a spring assembly 68, and a spindle 69 secured at its lower end to the framework of the indicator housing, and having its axis coincident with the axis of rotation of disc 45. The upper end of spindle 69 is engaged by the inner end of the spring assembly 68. The said spring assembly has its outer end secured to the disc 45 to rotate therewith in the manner more fully illustrated and described in copending application No. 424,154 filed April 19, 1954, and assigned to the assignee of the subject application. If the drive from rotor 44 has been properly adjusted, this flashing of the lamp will occur opposite the "zero" mark on the dial 35. At a certain interval thereafter, depending upon the distance A—B being measured, the lamp will flash again to illuminate that portion of the dial opposite the angular position to which the lamp-carrying arm has meanwhile advanced. This second flashing of the lamp will indicate the distance A—B, and will be produced by the effect of the returning sound beam striking the transducer and generating in coil 22 a current impulse that triggers the amplifier assembly $V_3$—$V_4$—$V_5$ and re-operates the lamp by way of cathode follower circuit 89 heretofore traced.

The grounded capacitors 80 and 81, in conjunction with rectifier tube $V_6$ and resistor 82, serve to stabilize the power supply to the amplifier tube plate circuits, as generated in transformer secondary circuit 66. Adjustable resistor 83 provides further regulation of the amplifying action of the first stage $V_3$. Line 95 is common to the plate circuits as well as to grids 73, 74, to which it leads by way of link 96.

Figure 3:
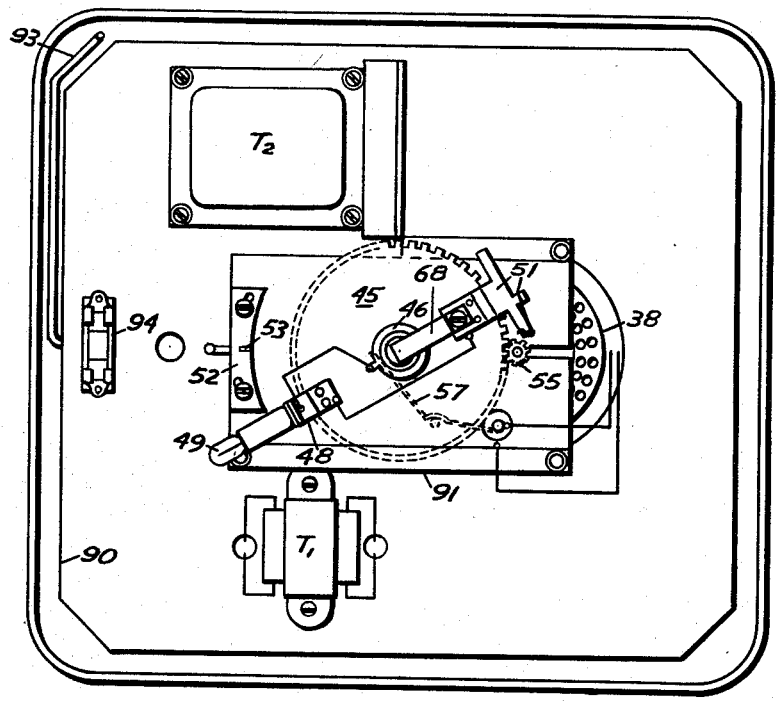
Figs. 3 and 4 are, respectively, plan and side elevation views of the assembly of parts contained within the indicator instrument of the system.
Figure 4:
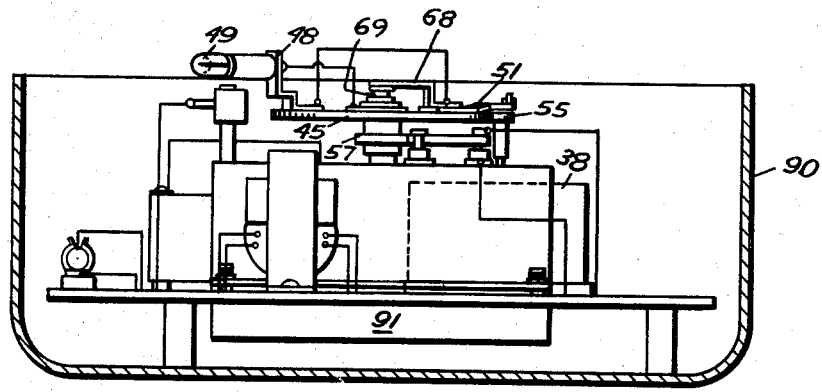

The transformers $T_1$ and $T_2$ may be mounted in the case 90 on either side of the motor and disc assembly, as indicated in Fig. 3, and said case may also contain a panel 91 for retaining the several tube components and related parts. By such arrangement the amount of wiring is reduced considerably, and the only external connections required are the cables 92 and 93, leading to the transducer and power supply points, respectively. Winding 97 of the transformer secondary supplies heating current to the cathode heaters of the various tubes, shown schematically at $H_1$ to $H_6$ in Fig. 6. Fuse 94 protects the transformer circuit.

As the height of the piled material 18 (or column of liquid) varies, due to removal or addition of material, its upper surface may assume the conical contour characteristic of piles of bulk material. If preferred, the angle of transmission of the sound beam may be tilted, rather than vertical as shown, to conform to such conical surface angle. In such event the position of the transducer would be shifted to one side of the true vertical position indicated in Fig. 1.

The diaphragm 21 of the transducer is sealed hermetically to the transducer boss 20 to provide weather-proofing and explosion-proofing of the magnetostriction oscillator unit within the transducer. The gasket 97 between the flanged mounting cup 15 and the upper surface of reflector 16 serves a similar purpose.

The diameter of baffle 23 will be chosen with a view to preventing direct sound transmission between the tube 24 and the pile 18, while not interfering with free passage of the sound from A to B, and return.

The reduction ratio between pinion 55 and disc gear 45 may, of course, be varied with corresponding variation in the calibration of the dial 35.

In lieu of the rubbing spring contact 51 for controlling the initiation of the sound cycle, there may be substituted an inductor arrangement consisting of a slug of magnet iron rotatable with the disc and adapted to induce current generation in a stationary electromagnet disposed in the location occupied by block 52 in Fig. 3.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A system for measuring the height of material stored on a surface constituting a datum plane comprising an electro-acoustic transducer for producing sonic vibrations disposed a predetermined distance above said surface, a curved reflector disposed below said transducer for directing sonic energy toward said surface, said reflector having a central aperture, a resonant tube projecting through said aperture and secured to said transducer, said resonant tube having one end disposed at the focal point of said reflector and said tube being tuned to an overtone of the fundamental wave generated by said transducer, sonic energy reflecting means secured to said one end of the resonant tube, a constant speed motor, switch means driven by said motor for periodically energizing said transducer to produce pulses of sonic energy, a lamp mounted for rotation driven by said motor, and means coupled to said transducer and responsive to reflected sonic energy for illuminating said lamp.

2. A system for measuring the height of material stored on a surface constituting a datum plane comprising an electro-acoustic transducer for producing sonic vibrations disposed a predetermined distance above said surface, a curved reflector disposed below said transducer for directing sonic energy toward said surface, said reflector having a central aperture, a resonant tube projecting through said aperture and secured to said transducer, said resonant tube having one end disposed at the focal point of said reflector and said tube being tuned to an overtone of the fundamental wave generated by said transducer, a baffle situated at the focal point of said curved reflector and secured to said tube, a constant speed motor, means including a switch having a contact arm driven by said motor for periodically triggering said transducer to produce pulses of sonic energy, a lamp mounted for rotation driven by said motor, means connecting said switch to said lamp to cause said lamp to be illuminated when said transducer is triggered, and means responsive to reflected sonic energy received by said transducer for illuminating said lamp.

References Cited in the file of this patent

UNITED STATES PATENTS

| | | |
|---|---|---|
| 1,217,585 | Fessenden | Feb. 27, 1917 |
| 1,677,943 | Williams | July 24, 1928 |
| 2,098,287 | Gent | Nov. 9, 1937 |
| 2,228,024 | Abrahams | Jan. 7, 1941 |
| 2,584,128 | Hildyard | Feb. 5, 1952 |
| 2,605,416 | Foster | July 29, 1952 |
| 2,617,874 | Lewis | Nov. 11, 1952 |
| 2,710,787 | Witt | June 14, 1955 |
| 2,767,385 | Smith | Oct. 16, 1956 |

OTHER REFERENCES

Journal of Iron and Steel, September 1950, vol. 166, page 84, by E. W. Voice.

Blast Furnace and Steel Plant, vol. 22, April 1954, page 436, D. W. Gillings.